United States Patent
Jiang et al.

(10) Patent No.: US 9,798,936 B2
(45) Date of Patent: Oct. 24, 2017

(54) SYSTEM AND METHOD FOR DETECTING OBSTACLES USING A SINGLE CAMERA

(75) Inventors: Ruyi Jiang, Shanghai (CN); Yankun Zhang, Shanghai (CN); Chuyang Hong, Shanghai (CN); Norman Weyrich, Ingolstadt (DE)

(73) Assignee: Harman International Industries, Incorporated, Stamford, CT (US)

( * ) Notice: Subject to any disclaimer, the term of this patent is extended or adjusted under 35 U.S.C. 154(b) by 215 days.

(21) Appl. No.: 14/391,937

(22) PCT Filed: Jul. 31, 2012

(86) PCT No.: PCT/CN2012/079404
§ 371 (c)(1),
(2), (4) Date: Oct. 10, 2014

(87) PCT Pub. No.: WO2014/019132
PCT Pub. Date: Feb. 6, 2014

(65) Prior Publication Data
US 2015/0078619 A1 Mar. 19, 2015

(51) Int. Cl.
*G06K 9/00* (2006.01)
*B60Q 9/00* (2006.01)
(Continued)

(52) U.S. Cl.
CPC ......... *G06K 9/00805* (2013.01); *B60Q 9/005* (2013.01); *G06K 9/00812* (2013.01);
(Continued)

(58) Field of Classification Search
CPC ........... G06K 9/00805; G06K 9/00798; G06K 9/00825; B60R 1/00; B60R 2300/607;
(Continued)

(56) References Cited

U.S. PATENT DOCUMENTS 6,483,429 B1 11/2002 Yasui et al.
7,298,247 B2 * 11/2007 Shimizu ................ B60Q 9/005
340/435

(Continued)

FOREIGN PATENT DOCUMENTS

CN 1255624 A 6/2000
CN 101256073 A 9/2008
(Continued)

OTHER PUBLICATIONS

Gioi et al., LSD: A Fast Line Segment Detector with a False Dectection Control, Apr. 2010 [retrieved Dec. 19, 2016], IEEE Transactions on Pattern Analysis and Machine Intelligence, vol. 32, Issue:4, pp. 722-732. Retrieved from the Internet: http://ieeexplore.ieee.org/stamp/stamp.jsp?arnumber=4731268.*

(Continued)

*Primary Examiner* — Andrew Moyer
*Assistant Examiner* — Dennis Rosario
(74) *Attorney, Agent, or Firm* — McCoy Russell LLP

(57) ABSTRACT

The present application provides an obstacle detection system and method thereof. The obstacle detection method comprises: obtaining a first image captured by a camera at a first time point; identifying a vertical edge candidate in the first image, and measuring a first length of the vertical edge candidate based on the first image; obtaining a second image captured by the camera at a second time point; measuring a second length of the vertical edge candidate based on the second image; calculating a difference between the first length and the second length; and comparing the difference with a predetermined length difference threshold, if the difference is greater than the length difference threshold, outputting a message that an obstacle is found.

20 Claims, 6 Drawing Sheets
(3 of 6 Drawing Sheet(s) Filed in Color)

(51) Int. Cl.
*G08G 1/16* (2006.01)
*G06T 5/00* (2006.01)
*G06T 7/13* (2017.01)

(52) U.S. Cl.
CPC ............. *G06T 5/006* (2013.01); *G06T 7/13* (2017.01); *G08G 1/168* (2013.01); *G06T 2207/10016* (2013.01); *G06T 2207/10024* (2013.01); *G06T 2207/30261* (2013.01)

(58) Field of Classification Search
CPC ...... B60R 2300/806; B60R 2300/8093; G08G 1/167; G08G 1/16; G08G 1/168; G06T 2207/30261; G06T 2207/30252
See application file for complete search history.

(56) References Cited

U.S. PATENT DOCUMENTS

| | | | | |
|---|---|---|---|---|
| 7,640,108 | B2* | 12/2009 | Shimizu | B60Q 9/005 180/204 |
| 8,618,955 | B2* | 12/2013 | Baker | B60Q 9/006 340/932.2 |
| 8,848,978 | B2* | 9/2014 | Yankun | G06K 9/00805 382/103 |
| 8,913,128 | B2* | 12/2014 | Wu | H04N 7/18 180/167 |
| 9,158,738 | B2* | 10/2015 | Matsuda | G06F 17/00 |
| 2001/0031068 | A1 | 10/2001 | Ohta et al. | |
| 2006/0256198 | A1 | 11/2006 | Nishiuchi | |
| 2007/0085901 | A1* | 4/2007 | Yang | H04N 7/181 348/47 |
| 2009/0268027 | A1* | 10/2009 | Yang | B60R 1/00 348/148 |

FOREIGN PATENT DOCUMENTS

| | | | |
|---|---|---|---|
| CN | 101438590 A | 5/2009 | |
| CN | 101497329 A | 8/2009 | |
| CN | 101881615 A | 11/2010 | |
| CN | 102257533 A | 11/2011 | |
| EP | 1094337 A2 | 4/2001 | |
| JP | 2010197414 A | 9/2010 | |
| WO | 03002375 A1 | 1/2003 | |
| WO | WO 2012004938 A1 * | 1/2012 | ............. G06F 17/00 |

OTHER PUBLICATIONS

Bertozzi, M. et al. "Stereo Inverse Perspective Mapping: Theory and Applications," Image and Vision Computing, vol. 16, No. 8, pp. 585-590, Jun. 1998, 6 pages.

Hartley, R. et al. "Multiple View Geometry in Computer Vision, Second Edition," Cambridge University Press, Mar. 2004, 673 pages. (Submitted in 4 Parts).

ISA State Intellectual Property Office of the People's Republic of China, International Search Report and Written Opinion in PCT/CN2012/079404, May 2, 2013, WIPO, 10 pages.

State Intellectual Property Office of the People's Republic of China, First Office Action and Search Report Issued in Application No. 20128007407.0, Jun. 8, 2016, 10 pages. (Submitted with English Summary of Office Action as Explanation of Relevance).

* cited by examiner

SYSTEM AND METHOD FOR DETECTING OBSTACLES USING A SINGLE CAMERA

CROSS REFERENCE TO RELATED APPLICATION

The present application is a U.S. National Phase of International Patent Application Ser. No. PCT/CN2012/079404 entitled "METHOD AND SYSTEM FOR DETECTING OBSTACLES USING A SINGLE CAMERA" and filed on Jul. 31, 2012, the entire contents of which are hereby incorporated by reference for all purposes.

TECHNICAL FIELD

The present application generally relates to system and method for detecting obstacles using a single normal camera.

BACKGROUND

Various obstacle detecting technologies have been developed, and have been used in vehicles to detect and remind a driver obstacles and/or pedestrians in the vicinity of a vehicle. Some solutions are based on radar, some solutions are based on multiple cameras, some solutions are based on laser, and some solutions are based on infrared cameras, but these solutions have a same drawback which is high cost. Although some conventional solutions using a single normal camera based on vertical edges of obstacles are low cost, these solutions generate too many false positives, especially when there are patterns on the road surface which patterns have edges substantially pointing to the focal point of the camera in a top view image. In view of the above, there is need to provide a more robust method and system for detecting obstacles using a single normal camera.

SUMMARY

In one embodiment of the present application, an obstacle detection method is provided. The method includes: obtaining a first image captured by a camera at a first time point; identifying a vertical edge candidate in the first image, and measuring a first length of the vertical edge candidate based on the first image; obtaining a second image captured by the camera at a second time point; measuring a second length of the vertical edge candidate based on the second image; calculating a difference between the first length and the second length; and comparing the difference with a predetermined length difference threshold, if the difference is greater than the length difference threshold, outputting a message that an obstacle is found, if the difference is less than the length difference threshold, filtering out the vertical edge candidate. As long as the camera and an obstacle are in relative motion, the obstacle can be detected using the method.

In some embodiments, the camera is able to capture color images and/or greyscale images.

In some embodiments, a vertical edge may be a substantially vertical line on an edge of an obstacle in an image.

In some embodiments, the first image is captured under a first relative position between the environment and the camera, and the second image is captured under a second relative position between the environment and the camera.

In some embodiments, the method may further include: identifying the vertical edge candidate in the second image.

In some embodiments, the method may further include: generating a first top view image based on the first image using an inverse perspective mapping method; measuring the length of the vertical edge candidate in the first top view image as the first length; generating a second top view image based on the second image using the inverse perspective mapping method; and measuring the length of the vertical edge candidate in the second top view image as the second length.

In some embodiments, the method may further include: performing distortion correction on the first image to obtain a first corrected image; generating the first top view image using the first corrected image; performing distortion correction on the second image to obtain a second corrected image; and generating the second top view image using the second corrected image. In some embodiments, the first top view image may be generated using the first image directly.

In some embodiments, measuring the first length based on the first image may cover the following embodiments: 1) measuring the length of the vertical edge candidate in the first image as the first length; 2) measuring the length of the vertical edge candidate in the first corrected image as the first length; and 3) measuring the length of the vertical edge candidate in the first top view image as the first length. Measuring the second length based on the second image may also cover three similar embodiments.

In some embodiments, the length difference threshold may be determined through experiments.

In some embodiments, the method may further include: measuring a deviation between the vertical edge candidate and a focal point of the camera in the first top view image; and comparing the measured deviation with a predetermined deviation threshold, if the measured deviation is greater than the deviation threshold, filtering out the vertical edge candidate.

In some embodiments, the method may further include: measuring a deviation between the vertical edge candidate and a focal point of the camera in the second top view image; and comparing the measured deviation with a predetermined deviation threshold, if the measured deviation is greater than the deviation threshold, filtering out the vertical edge candidate.

In some embodiments, the deviation between the vertical edge candidate and the focal point may be an angle between the vertical edge candidate and a line going through a point on the vertical edge candidate and the focal point. In some embodiments, the deviation between the vertical edge candidate and the focal point may be the distance from the focal point to the vertical edge candidate.

In some embodiments, the method may be used in a parking assist method, to identify and remind a driver whether there is obstacle behind a vehicle when the driver is parking the vehicle.

In some embodiments, the first image is captured when the vertical edge candidate enters into a tracking region, and the second image is captured when the vertical edge candidate enters into an alert region which is smaller than the tracking region and falls in the tracking region. When a vertical edge candidate enters into the alert region, it indicates that the vertical edge candidate is very close to the camera, and the driver should be reminded. The size and shape of the alert region may be defined based on specific needs of a driver. For example, if a driver is cautious, the alert region may be defined relatively large such that an alert will be generated when a vertical edge is not so close to the camera. If a driver is very good at driving, the alert region may be defined relatively small such that no alert will be generated until a vertical edge is very close to the camera. The tracking region may be defined such that the difference between the first length and the second length of a true vertical edge is large enough to differentiate it from false candidates.

In some embodiments of the present application, an obstacle detection system is provided. The obstacle detection system includes an output device and a processing device configured to: obtain a first image captured by a camera at a first time point; identify a vertical edge candidate based on the first image, and measure a first length of the vertical edge candidate based on the first image; obtain a second image captured by the camera at a second time point; measure a second length of the vertical edge candidate based on the second image; calculate a difference between the first length and the second length; and compare the difference with a predetermined length difference threshold, if the difference is greater than the length difference threshold, instruct the output device to output a message that an obstacle is found.

In some embodiments, the obstacle detection system may further include a memory device for storing status of vertical edge candidates.

In some embodiments, the obstacle detection system may further include the camera for capturing color images or greyscale images.

In some embodiments, the processing device may be further configured to: generate a first top view image based on the first image using an inverse perspective mapping method; measure the length of the vertical edge candidate in the first top view image as the first length; generate a second top view image based on the second image using the inverse perspective mapping method; and measure the length of the vertical edge candidate in the second top view image as the second length.

In some embodiments, the processing device may be further configured to: perform distortion correction on the first image to obtain a first corrected image; generate the first top view image using the first corrected image; perform distortion correction on the second image to obtain a second corrected image; and generate the second top view image using the second corrected image.

In some embodiments, the processing device may be further configured to: measure a deviation between the vertical edge candidate and a focal point of the camera in the first top view image; and compare the measured deviation with a predetermined deviation threshold, if the measured deviation is greater than the deviation threshold, filter out the vertical edge candidate.

In some embodiments, the processing device may be further configured to: measure a deviation between the vertical edge candidate and a focal point of the camera in the second top view image; and compare the measured deviation with a predetermined deviation threshold, if the measured deviation is greater than the deviation threshold, filter out the vertical edge candidate.

In some embodiments, the deviation between the vertical edge candidate and the focal point may be an angle between the vertical edge candidate and a line going through a point on the vertical edge candidate and the focal point. In some embodiments, the deviation between the vertical edge candidate and the focal point may be the distance from the focal point to the vertical edge candidate.

In some embodiments, the system may be mounted on a vehicle and used as a parking assist system, to identify and remind a driver whether there is obstacle behind the vehicle when the driver is parking the vehicle.

In some embodiments, the first image is captured when the vertical edge candidate enters into a tracking region, and the second image is captured when the vertical edge candidate enters into an alert region which is smaller than the tracking region and falls in the tracking region. When a vertical edge candidate enters into the alert region, it indicates that the vertical edge candidate is very close to the camera, and the driver should be reminded. The size and shape of the alert region may be defined based on specific needs of a driver. For example, if a driver is cautious, the alert region may be defined relatively large such that an alert will be generated when a vertical edge is not so close to the camera. If a driver is very skillful, the alert region may be defined relatively small such that no alert will be generated until a vertical edge is very close to the camera. The tracking region may be defined such that the difference between the first length and the second length of a true vertical edge is large enough to differentiate it from false candidates.

Vertical edge candidates of patterns on the ground may be filtered out by using the method and system of the present application, such that false positives may be reduced.

BRIEF DESCRIPTION OF THE DRAWINGS

This application contains at least one drawing executed in color. Copies of this patent or patent application publication with color drawing(s) will be provided by the Office upon request and payment of the necessary fee.

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
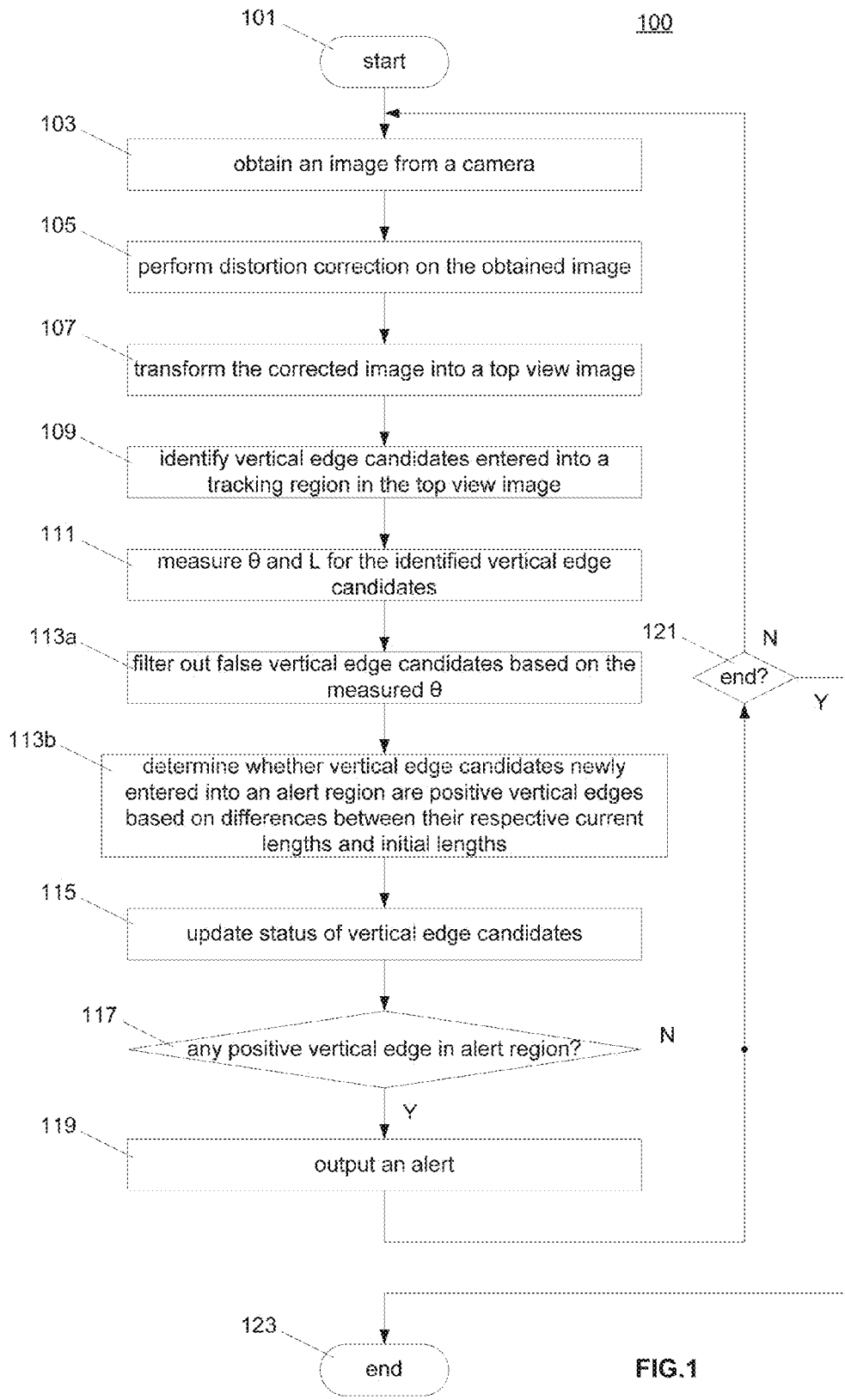
FIG. 1 illustrates a schematic flow chart of an obstacle detection method according to one embodiment of the present application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The inventors of the present application found that the length of a vertical edge of an obstacle changes significantly with the relative motion between the obstacle and a camera used to detect obstacles, but the length of a false vertical edge of a pattern on the ground remains constant substantially. To certain extent, the method and system of the present application differentiate obstacles from patterns on the ground based on this.

Referring to FIG. 1, a schematic flow chart of an obstacle detection method 100 is shown. In block 101, start obstacle detection.

In block 103, obtain an image from a camera. In some embodiments, a single camera may be used to detect obstacles. In some embodiments, the camera is able to capture colour images or greyscale images. In some embodiments, images may be obtained at evenly spaced time points from the camera, and the images may be processed one by one successively. In some embodiments, a colour image may be converted to a greyscale image before further processing.

Figure 2A:
FIG. 2A illustrates an example image captured by a camera.
Figure 2B:
FIG. 2B illustrates an example image obtained by performing distortion correction on the example image of FIG. 2A.

In block 105, perform distortion correction on the obtained image to obtain a corrected image. There is significant distortion in images captured by wide angle cameras, especially those captured by fish-eye cameras. If an image is not corrected, a vertical edge in the image may not be straight, and may be missed. There are many models that can mathematically describe the relationship between pixels before distortion correction and pixels after distortion correction, correspondingly. By calibration, the camera's distortion coefficients may be obtained, and these coefficients may be substituted in one of the models to perform distortion correction on images captured by the camera. FIG. 2A and FIG. 2B illustrate an example image captured by a camera, and an example corrected image, respectively.

Figure 3A:
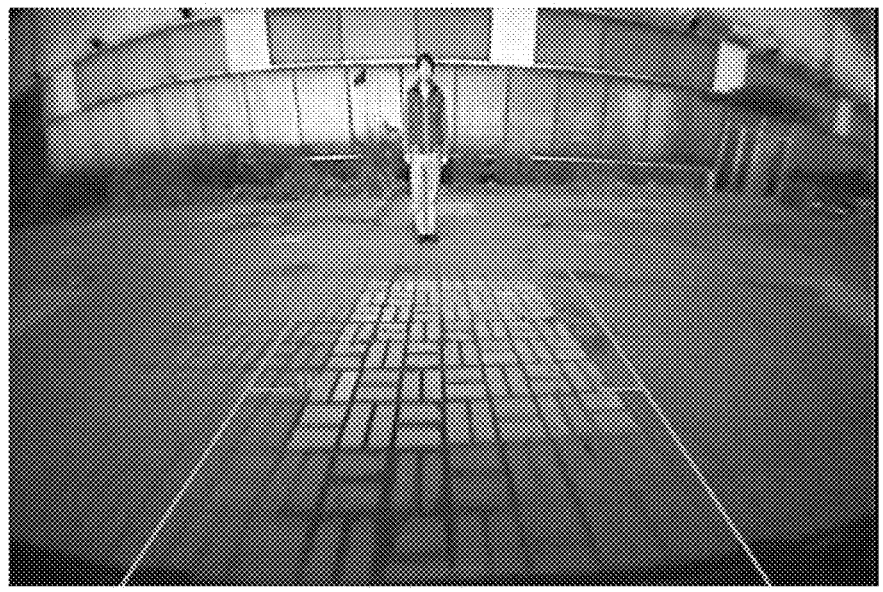
FIG. 3A illustrates an example image captured by a camera.
Figure 3B:
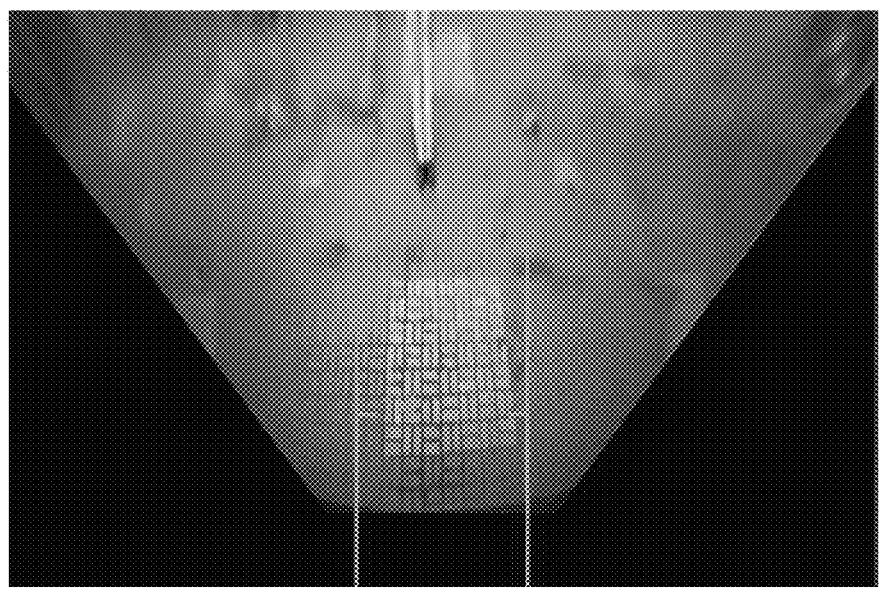
FIG. 3B illustrates an example top view image obtained by transforming the example image of FIG. 3A using an inverse perspective mapping method.

In block 107, transform the corrected image into a top view image. In a top view image, the length of a vertical edge may be lengthened, such that the accuracy of the method may be enhanced. Additionally, in a top view image, some false vertical edges may be filtered out based on an angle θ between a vertical edge candidate and a line passing a point on the vertical edge candidate and the focal point of the camera. In a top view image, the focal point of the camera means the projection of the focal point on the top view image. FIG. 3A and FIG. 3B illustrate an example image and an example top view image generated based on the example image, respectively.

An inverse perspective mapping method may be used to transform the corrected image into a top view image. For example, a four point correspondence algorithm (Richard H. and Andrew Z. Multiple View Geometry in Computer Vision Second Edition. Cambridge University Press, March 2004.), or an algorithm using intrinsic and extrinsic parameters of the camera (Bertozz, M. and Broggi, A. and Fascioli, A. Stereo inverse perspective mapping: theory and applications. Image and Vision Computing. 1998, 16(8):585-590) may be used to transform the corrected image into a top view image.

In block 109, identify vertical edge candidates entered into a tracking region in the top view image. In some embodiments, a fast line segment method may be used to identify vertical edge candidates. In some embodiments, too short obstacles e.g. obstacles less than 20 cm high, may be ignored in parking assistance. Therefore, a length threshold may be set such that lines shorter than the length threshold may be filtered out. The length threshold may be set according to needs and specific conditions such as intrinsic and extrinsic parameters of the camera. For example, the length threshold may be set as 20 pixels, 30 pixels, 40 pixels etc.

Figure 4A:
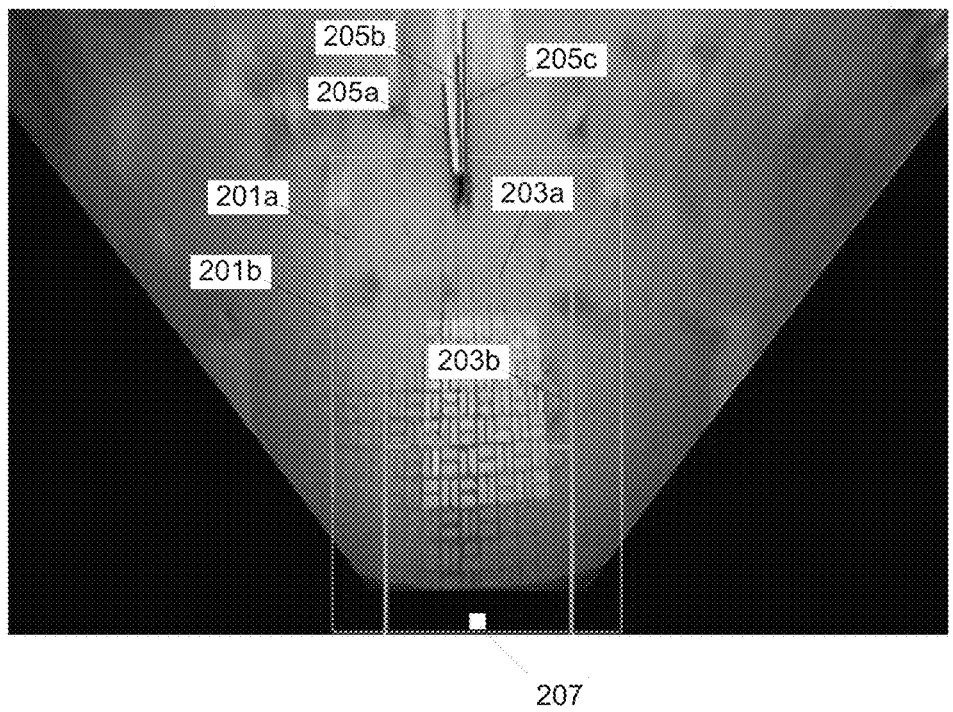
FIG. 4A illustrates an example top view image with several vertical edge candidates therein.

Referring to FIG. 4A, an exemplary first top view image generated based on a first image captured at a first time point is illustrated. In the first top view image, a tracking region 201a defined by a first rectangle frame 201b may be provided in top view images. In some embodiments, lines outside the tracking region 201a may be filtered out to reduce computation complexity, and lines entered into the tracking region 201a may be identified as vertical edge candidates. In FIG. 4A, three vertical edge candidates 205a, 205b, and 205c are identified.

Referring again to FIG. 4A, an alert region 203a defined by a second rectangle frame 203b may be provided in top view images, where the alert region 201a is located in the tracking region 203a. As long as there is a positive vertical edge entered into the alert region 203a, an alert may be generated and output to remind a driver that there is an obstacle in the vicinity of the vehicle.

Figure 4B:
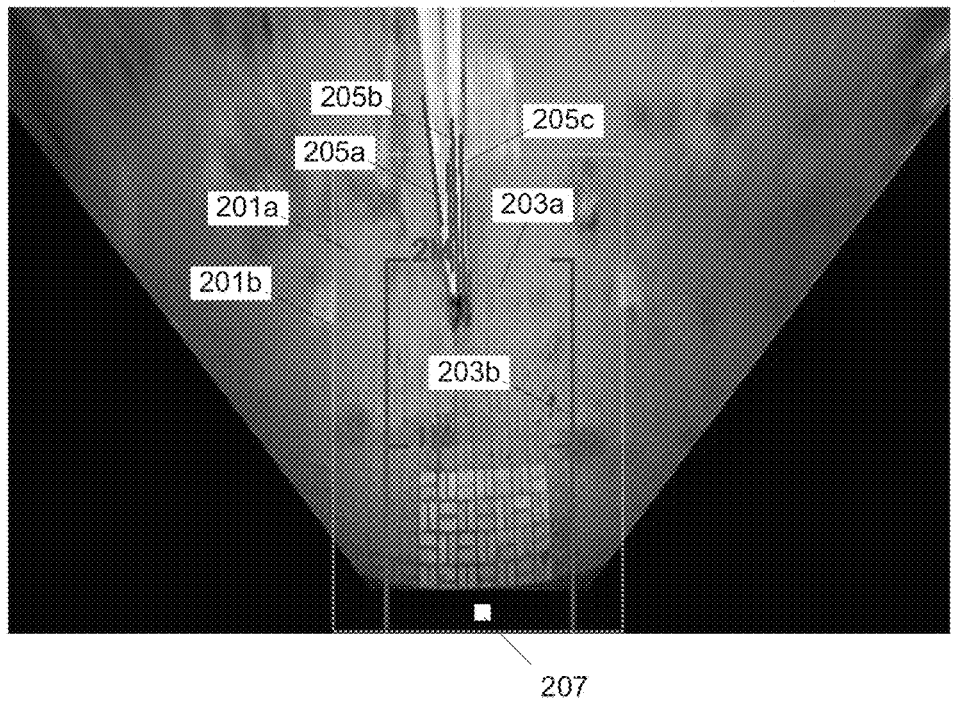
FIG. 4B illustrates another example top view image obtained after the example top view image of FIG. 4A with several vertical edge candidates therein.

Referring to FIG. 4B, an exemplary second top view image generated based on a second image captured at a second time point is illustrated. In FIG. 4B, the vertical edge candidates 205b and 205c entered into the alert region 203a, and the vertical edge candidate 205a is still outside the alert region 203a. Since there is vertical edge entered into the alert region 203a, an alert shall be generated.

In FIG. 4A, focal point 207 is actually a projection of the focal point of the camera on the top view image. For convenience, projection of a focal point on a top view image will be referred to as a focal point hereinafter.

Figures 5A, 5B, 5C:
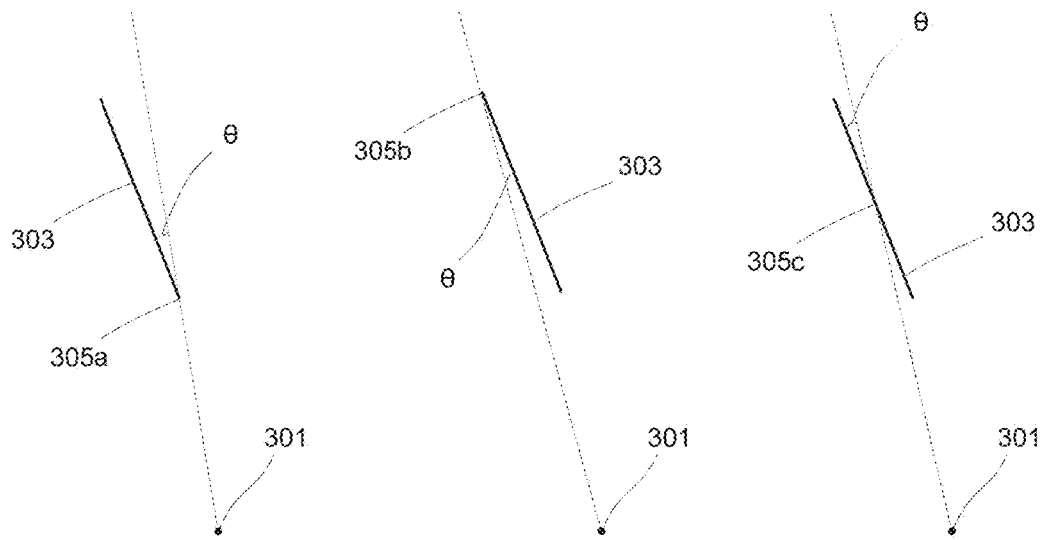
FIG. 5A illustrates a deviation angle between a vertical edge candidate and a line goes through the lower end point of the vertical edge candidate and the focal point.
FIG. 5B illustrates a deviation angle between a vertical edge candidate and a line goes through the top end point of the vertical edge candidate and the focal point.
FIG. 5C illustrates a deviation angle between a vertical edge candidate and a line goes through the middle point of the vertical edge candidate and the focal point.

In block 111, measure deviation angle θ and L for the vertical edge candidates identified in block 109. θ is an angle between a vertical edge candidate and a line goes through a reference point on the vertical edge candidate and the focal point in a top view image. The reference point may be any point on the vertical edge candidate, and illustrative examples will be given below. Referring to FIG. 5A, a lower end point 305a of a vertical edge candidate 303 is chosen as the reference point, and θ is an angle between the vertical edge candidate 303 and a line goes through the lower end point 305a of the vertical edge candidate 303 and the focal point 301. Referring to FIG. 5B, a higher end point 305b of the vertical edge candidate 303 is chosen as the reference point, and θ is an angle between the vertical edge candidate 303 and a line goes through the higher end point 305b of the vertical edge candidate 303 and the focal point 301. Referring to FIG. 5C, a middle point 305c of the vertical edge candidate 303 is chosen as the reference point, and θ is an angle between the vertical edge candidate 303 and a line goes through the middle point 305c of the vertical edge candidate 303 and the focal point 301.

In block 113a, filter out false vertical edge candidates based on the measured θ. In theory, in a top view image, a real vertical edge should point to the focal point of the camera exactly, but in practice, there is a deviation in most cases because of various errors. In addition, obstacles' edges may not be strictly vertical, so they may not point to the focal point exactly. Therefore, a deviation threshold may be set to tolerate these situations.

In some embodiments, the deviation angle may be used to represent the deviation. In some embodiments, the distance from the focal point to the vertical edge candidate may be used to represent the deviation.

In one embodiment, the deviation angle is used to represent the deviation between a vertical edge candidate and the focal point. A deviation threshold was set, and if the deviation angle of a vertical edge candidate is greater than the deviation threshold, the vertical edge candidate will be deemed as false vertical edge and will be filtered out. In some embodiments, the deviation threshold may be set based on experiments. In one embodiment, the deviation threshold was set as 0.1 rad which is about 5.7°.

In block 113b, determine whether vertical edge candidates newly entered into the alert region 203b are positive vertical edge candidates based on differences between their respective initial lengths and current lengths. As mentioned above, the inventors found that the length of a vertical edge of an obstacle in images captured by a camera, which moves relative to the obstacle, changes significantly. On the contrary, an edge of a pattern on the ground in images does not change substantially. Therefore, a false vertical edge of a pattern on the ground may be filtered out using a difference between its first length in a first image captured at a first time point and its second length in a second image captured at a second time point.

To enlarge the difference to enhance accuracy, top view images may be used, and the interval between the first time point and the second time point may be increased. In parking assist systems, a tracking region and a smaller alert region located in the tracking region may be defined. A length of a vertical edge candidate in an image which is captured when the vertical edge candidate enters into the tracking region may be used as a first length or an initial length, and a length of the vertical edge candidate in an image which is captured when the vertical edge candidate enters into the alert region may be used as a second length or a current length.

A difference threshold may be set, and if a difference between a first length and a second length of a vertical edge candidate is greater than the difference threshold, determine that the vertical edge candidate is a positive vertical edge. The difference threshold may be set according to camera parameters and experiments. In one embodiment, the difference threshold was set as 2 pixels.

In block 115, update status of vertical edge candidates. The status of vertical edge candidates may be updated in real-time. For example, when the deviation angle of a vertical edge candidate is measured based on a current image, the deviation angle of the vertical edge candidate may be updated; when the length of the vertical edge candidate is measured based on the current image, the current length of the vertical edge candidate may be updated; and when the vertical edge candidate is determined to be a false candidate or a true vertical edge based on the current image, the attribute of the vertical edge candidate may be updated.

In some embodiments, as long as a vertical edge candidate is determined to be a false candidate or a true vertical edge, the attribute of the vertical edge candidate may be fixed, and no more determination will be performed on this vertical edge candidate in the future.

In some embodiments, a status table may be used to record the status of vertical edge candidate. Some columns of an exemplary status table are given in the below Table 1.

TABLE 1

| ID | Attribute | θ | Initial Length | Current Length |
| --- | --- | --- | --- | --- |
| 01 | false | 4 rad | 45 pixels | 45 pixels |
| 02 | positive | 0.05 rad | 56 pixels | 68 pixels |
| 03 | candidate | 0.08 rad | 44 pixels | 56 pixels |
| 04 | false | 0.06 rad | 40 pixels | 40 pixels |

In some embodiments, Kanade-Lucas-Tamasi tracking method may be used to determine whether a vertical edge candidate identified in a second image captured at a second time point later than a first time point corresponds to another identified in a first image captured at the first time point. If yes, the vertical edge candidates identified in the first and the second images, respectively, will be deemed as the same vertical edge candidate. If not, the vertical edge candidate identified in the second image will be deemed as a new identified vertical edge candidate.

In block 117, determine whether there is any positive vertical edge entered into the alert region. If yes, go to block 119, and if not, go to block 121. If there is a positive vertical edge entered into the alert region, it means that the corresponding obstacle is very close to the camera.

Figure 6:
FIG. 6 illustrates an example screen of an obstacle detection system according to one embodiment of the present application.

In block 119, if it is determined that there is a positive vertical edge entered into the alert region, generate an alert. For example, in parking assist systems, an alert may be a sound alert such as a beep. In addition, referring to FIG. 6, the actual distance between the obstacle and the camera may be calculated based on the images, and presented to a driver on a screen.

In block 121, determine whether an end instruction is received. If yes, go to block 123 to end the method; and if no, go to block 103 to obtain a new image to process.

Figure 7:
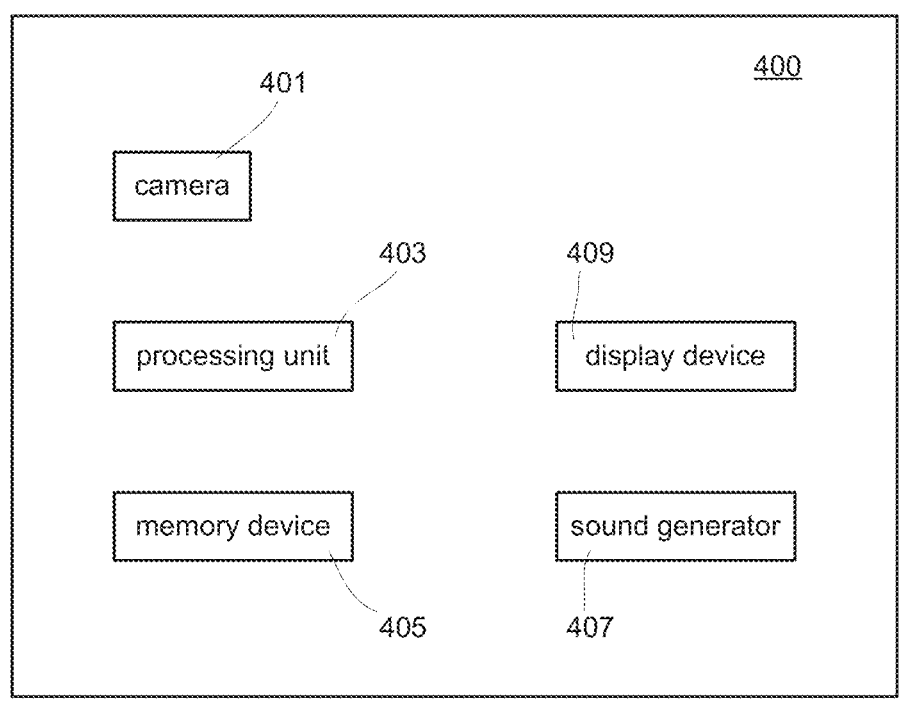
FIG. 7 illustrates a schematic diagram of an obstacle detection system according to one embodiment of the present application.

Referring to FIG. 7, a schematic block diagram of an obstacle detection system 400 is illustrated. The obstacle detection system 400 includes a camera 401, a processing unit 403, a memory device 405, a sound generator 407, and a display device 409. In some embodiments, the obstacle detection system 400 may be mounted on a vehicle to detect and remind the driver of obstacles in a vicinity of the vehicle.

When the obstacle detection system 400 is used in a parking assist system, the camera 401 may be mounted on the rear part of the vehicle. During parking, the camera 401 may keep capturing images at evenly spaced time points.

The processing unit 403 may be configured to perform the method 100 on the images captured by the camera 401. In some embodiments, the processing unit 403 may be a CPU, or a GPU, or a DSP etc. In some embodiments, the processing unit 403 may be a combination of a plurality of computing components and other components. The memory device 405 may be configured to store status of vertical edge candidates, an operating system, and any necessary computer program.

In some embodiments, the sound generator 407 may be a buzzer configured to generate a beep when it receives an alert instruction from the processing unit 403. In some embodiments, the sound generator 407 may be a speaker system configured to generate a vocal alert when it receives an alert instruction from the processing unit 403.

The display device 409 may display in real-time images captured by the camera 401 and positive vertical edges identified. In some embodiments, the display device 409 may also display the distance between an identified positive vertical edge and the camera 401.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An obstacle detection method comprising:
   obtaining a first image captured by a camera at a first time point;
   generating a first transformed image based on the first image;
   identifying a vertical edge candidate in the first transformed image, and measuring a first length of the vertical edge candidate based on the first transformed image;
   obtaining a second image captured by the camera at a second time point;
   generating a second transformed image based on the second image;
   measuring a second length of the vertical edge candidate based on the second transformed image;
   measuring an angular deviation between the vertical edge candidate and a focal line in the first transformed image or the second transformed image;
   comparing the measured angular deviation with a predetermined angular deviation threshold to filter out a false vertical edge candidate;
   calculating a difference between the first length and the second length; and
   comparing the difference with a predetermined length difference threshold, if the difference is greater than the predetermined length difference threshold, outputting a message that an obstacle is found;
   wherein the vertical edge candidate comprises a straight line segment in the first and second transformed images.

2. The method of claim 1, wherein the camera is a visual spectrum camera able to capture color images and/or greyscale images.

3. The method of claim 1,
   wherein the first transformed image comprises a first top view image;
   wherein the second transformed image comprises a second top view image;
   wherein generating the first top view image is based on the first image using an inverse perspective mapping method; and
   wherein generating the second top view image is based on the second image using the inverse perspective mapping method; and further comprising
   measuring a length of the vertical edge candidate in the first top view image as the first length; and
   measuring a length of the vertical edge candidate in the second top view image as the second length.

4. The method of claim 3, further comprising:
   performing distortion correction on the first image to obtain a first corrected image;
   generating the first top view image using the first corrected image;
   performing distortion correction on the second image to obtain a second corrected image; and
   generating the second top view image using the second corrected image.

5. The method of claim 3,
   wherein comparing the measured angular deviation with the predetermined angular deviation threshold to filter out the false vertical edge candidate includes filtering out the vertical edge candidate if the measured angular deviation is greater than the predetermined angular deviation threshold, and
   wherein the focal line comprises a line passing through a projected focal point of the camera in the first top view image.

6. The method of claim 3,
   wherein measuring the angular deviation includes measuring the angular deviation between the vertical edge candidate and the focal line in the first top view image or the second top view image;
   wherein comparing the measured angular deviation with the predetermined angular deviation threshold to filter out the false vertical edge candidate includes filtering out the vertical edge candidate if the measured angular deviation is greater than the predetermined angular deviation threshold; and
   wherein the focal line comprises a line passing through a projected focal point of the camera in the second top view image.

7. The method of claim 5, wherein the focal line further passes through a point on the vertical edge candidate.

8. The method of claim 1, where the method is a parking assist method, to identify and remind a driver whether there is any obstacle behind a vehicle when the driver is parking the vehicle, and wherein the vertical edge candidate is identified using a fast line segment method.

9. The method of claim 1, wherein the first image is captured in response to the vertical edge candidate entering into a tracking region, and the second image is captured in response to the vertical edge candidate entering into an alert region which is smaller than the tracking region and falls in the tracking region, the method further comprising determining if the vertical edge candidate within the alert region is an obstacle, and outputting an alert via a speaker responsive to determining that the vertical edge candidate within the alert region is an obstacle.

10. The method of claim 9, wherein the tracking region is configured such that a difference between the first length and the second length of the vertical edge candidate when the vertical edge candidate is identified as a true vertical edge is large enough to differentiate the true vertical edge from false candidates.

11. An obstacle detection system comprising:
    a processing device configured to:
    obtain a first image captured by a camera at a first time point;

generate a first top view image based on the first image;
identify a vertical edge candidate based on the first top view image, and measure a first length of the vertical edge candidate based on the first top view image;
obtain a second image captured by the camera at a second time point;
generate a second top view image based on the second image;
measure a second length of the vertical edge candidate based on the second top view image;
measure an angular deviation between the vertical edge candidate and a focal line in the first top view image or the second top view image;
compare the measured angular deviation with a predetermined angular deviation threshold to filter out a false vertical edge candidate;
calculate a difference between the first length and the second length; and
compare the difference with a predetermined length difference threshold, if the difference is greater than the predetermined length difference threshold, instruct an output device to output a message that an obstacle is found;
wherein the vertical edge candidate comprises a straight line segment in the first and second top view images.

12. The obstacle detection system of claim 11, wherein the camera is a visual spectrum camera configured to capture color images or greyscale images.

13. The obstacle detection system of claim 11, further comprising a memory device for storing a status of vertical edge candidates, and wherein the vertical edge candidate is identified using a fast line segment method.

14. The obstacle detection system of claim 11, wherein the processing device is further configured to:
measure a length of the vertical edge candidate in the first top view image as the first length; and
measure a length of the vertical edge candidate in the second top view image as the second length;
wherein generating the first top view image based on the first image is performed using an inverse perspective mapping method; and
wherein generating the second top view image based on the second image is performed using the inverse perspective mapping method.

15. The obstacle detection system of claim 14, wherein the processing device is further configured to:
perform distortion correction on the first image to obtain a first corrected image;
generate the first top view image using the first corrected image;
perform distortion correction on the second image to obtain a second corrected image; and
generate the second top view image using the second corrected image.

16. The obstacle detection system of claim 14, wherein
comparing the measured angular deviation with the predetermined angular deviation threshold includes filtering out the vertical edge candidate if the measured angular deviation is greater than the predetermined angular deviation threshold, and
wherein the focal line comprises a line passing through a projected focal point of the camera in the first top view image.

17. The obstacle detection system of claim 14, wherein
comparing the measured angular deviation with the predetermined angular deviation threshold includes filtering out the vertical edge candidate if the measured angular deviation is greater than the predetermined angular deviation threshold, and
wherein the focal line comprises a line passing through a projected focal point of the camera in the second top view image.

18. The obstacle detection system of claim 16, wherein the focal line further passes through a point on the vertical edge candidate.

19. The obstacle detection system of claim 11, where the system is a vehicle parking assist system to identify and remind a driver whether there is any obstacle behind a vehicle when the driver is parking the vehicle.

20. The obstacle detection system of claim 11, wherein the first image is captured when the vertical edge candidate enters into a tracking region, and the second image is captured when the vertical edge candidate enters into an alert region which is smaller than the tracking region and falls in the tracking region.

* * * * *